(12) United States Patent
Harding (10) Patent No.: US 9,390,432 B2
(45) Date of Patent: Jul. 12, 2016

(54) EMAIL MARKETING CAMPAIGN AUDITOR SYSTEMS

(71) Applicant: INNOVYX, INC., Seattle, WA (US)

(72) Inventor: Derek Harding, Lake Forest Park, WA (US)

(73) Assignee: JAVELIN DIRECT INC., Irving, TX (US)

( * ) Notice: Subject to any disclaimer, the term of this patent is extended or adjusted under 35 U.S.C. 154(b) by 226 days.

(21) Appl. No.: 13/937,139

(22) Filed: Jul. 8, 2013

(65) Prior Publication Data
US 2015/0012351 A1 Jan. 8, 2015

(51) Int. Cl.
G06F 11/00 (2006.01)
G06Q 30/02 (2012.01)

(52) U.S. Cl.
CPC .......... *G06Q 30/0244* (2013.01); *H05K 999/00* (2013.01)

(58) Field of Classification Search
CPC ............ G06Q 30/0244; G06F 11/0793; G06F 11/0709; G06F 11/0772; G06F 11/0781
USPC .......................................... 714/48; 705/14.43
See application file for complete search history.

(56) References Cited

U.S. PATENT DOCUMENTS

| | | | |
|---|---|---|---|
| 6,708,205 B2 | 3/2004 | Sheldon et al. | |
| 7,882,179 B2 | 2/2011 | Witchel | |
| 7,904,348 B2 | 3/2011 | Johnson et al. | |
| 8,166,123 B2 | 4/2012 | Witchel | |
| 2005/0188034 A1 | 8/2005 | Israel et al. | |
| 2006/0026246 A1 | 2/2006 | Fukuhara et al. | |
| 2006/0031352 A1* | 2/2006 | Marston | H04L 67/22 709/206 |
| 2006/0041505 A1* | 2/2006 | Enyart | 705/40 |
| 2006/0048224 A1* | 3/2006 | Duncan | G06F 21/6218 726/22 |
| 2012/0042025 A1 | 2/2012 | Jamison et al. | |
| 2012/0072159 A1 | 3/2012 | Wang | |
| 2013/0024525 A1* | 1/2013 | Brady et al. | 709/206 |
| 2013/0054613 A1* | 2/2013 | Bishop | 707/748 |
| 2013/0066730 A1 | 3/2013 | Myslinski | |

FOREIGN PATENT DOCUMENTS

WO    WO 2007027112 A1    3/2007

* cited by examiner

*Primary Examiner* — Yair Leibovich
(74) *Attorney, Agent, or Firm* — Winston & Strawn LLP (57) ABSTRACT

The present invention relates to a method and system that audits email marketing campaigns. The system may include an audit SMTP server and an audit processor. The audit SMTP server may be configured to receive and store email messages transmitted over a public network and addressed to a designated email inbox at the audit SMTP server established for performing quality diagnostics. The received email messages were generated at a source email SMTP server and include a plurality of parts. The audit processor may be configured to parse the individual received email messages into parts and apply a group of different performance processes to the different parts. The audit processor may be further configured to produce and store output data generated from the performance processes that identifies quality characteristics in the different parts that represent faults that will occur from the use of the template in an email marketing campaign.

20 Claims, 6 Drawing Sheets

**MESSAGE ASSESSMENT AND
QA RESULTS**

MESSAGE DETAILS —— 402

- Account Name: Lexus
- Account Type: BUSINESS_UNIT
- ExactTarget MID: 7001631
- Send ID: 64098
- Send Date/Time: 2013-01-24 11:12:00
- Email Name: Lexus CT-IS Repurchase_Dec2of2 Copy
- Message Subject Line: Test Send - Don't miss out on the Lexus 2013 CT or IS
- List ID/Name: (387) All Subscribers
- User Initiated Send: None Found Reply Mail Management

- Reply Friendly Name: Lexus
- Reply From Address: Lexus@reply.lexuscommunications.net
- Forwarding Address: customer_replies@toyota.com

ANALYSIS SUMMARY —— 404

■ Error(s) —— 406

| Step | Error Description |
|---|---|
| 3 | 404 Not Found (http://click.lexuscommunications.net/?qs=a68bb1e23b746ceeaa129a77d5abe6826e48d5c053ae2f7cc23239ed3808f74c382e466313999b8f) |

■ Warning(s) —— 408

| Step | Warning Description |
|---|---|
| 6 | HTML Validation problems found. |

EMAIL MARKETING CAMPAIGN AUDITOR SYSTEMS

FIELD OF THE INVENTION

The invention relates to a method and system that supports electronic service provider platforms. More specifically, it relates to one or more tools that improve efficacy of electronic marketing campaigns.

BACKGROUND

Despite advances in the capabilities and sophistication of email marketing software and platforms in the past decade, the current state of quality control for email marketing campaigns is the same as it was at the turn of the millennium. Marketers are currently using sophisticated segmentation and dynamic content capabilities to send more email to more people more often than ever before. Production timeframes are tight and content loads are greater. The result is quality assurance for email marketing campaigns is a growing challenge. Virtually everyone has experienced broken links, missing images, scrambled subject lines, incorrectly substituted personalization fields and faulty subscription removal functionality.

Systems and methods are needed to provide advance tools for improving email marketing campaigns.

SUMMARY

According to the principles of the invention, a system that audits email marketing campaigns is provided, the system including an audit Simple Mail Transfer Protocol (SMTP) server and an audit processor and analyzer. The audit SMTP server is configured to receive and store messages transmitted over a public network and addressed to a designated email inbox at the audit SMTP server established for performing quality diagnostics. The received email messages were generated from one or more templates at a source email SMTP server and when received, include a plurality of parts including at least an address part, subject header part, time stamp part, HTML links to web content part, and a message body part. At least some of which or a portion thereof of the plurality of parts are generated after the message body is generated.

The audit processor and analyzer is coupled to the designated email inbox and is configured to parse the individual received email messages into parts and to apply a group of different performance processes to the different parts of the email messages. The performance processes also include a subset of the performance that applies individual device or agent profiles from a directory of profiles to individual parts or portions of the message body of the received email messages. The audit processor and analyzer also is configured to process external network messages received in response to the audit processor and analyzer individually applying the profiles. The audit processor and analyzer is further configured to produce and store output data generated from the performance processes that identifies quality characteristics in the different parts of the individual received email messages that represents faults that will occur from the use of the template in an email marketing campaign.

In one embodiment, the audit processor and analyzer generates a multi-part report that incorporates the output data for an individual received email messages. In another embodiment, the multi-part report is transmitted over the public network. In one embodiment, the public network is the Internet. In another embodiment, the subset executes HTML links and interacts with other content in the received email messages by repeatedly specifying a device profile and storing the resulting output generated from executing HTML links for each individual received email message. In yet another embodiment, the performance process include applying diagnostics to a portion of individual received messages that were generated as part of forming email messages at source SMTP servers. In one embodiment, the performance processes include applying heuristics to a portion of individual received messages that were generated as part of forming email messages at source SMTP servers.

Another embodiment of the present invention is a method that audits email marketing campaigns, the method including receiving and storing email messages transmitted over a public network and addressed to a designated email inbox at an audit SMTP server that is established for performing quality diagnostics. The received email messages were generated from one or more templates at a source email SMTP server and when received, include a plurality of parts including at least an address part, subject header part, time stamp part, HTML links to web content part, and a message body part. At least some of the plurality of parts or a portion thereof was generated after the message body is generated.

The method also including parsing the individual received email messages into parts and applying a group of different performance processes to the different parts of the email messages. The performance processes including a subset of the performance that applies individual device or agent profiles from a directory of profiles to individual parts or portions of the message body part of the received email messages. The method including processing external network messages received in response to the individually applied profiles.

The method also including producing and storing output data generated from the performance processes that identifies quality characteristics in the different parts of the individual received email messages that represent faults that will occur from the use of the template in an email marketing campaign.

In one embodiment, the method includes generating a multi-part report that incorporates the output data for an individual received email messages. In another embodiment, the multi-part report is transmitted over the public network. In one embodiment, the public network is the Internet. In another embodiment, the subset executes HTML links and interacts with other content in the received email messages by repeatedly specifying a device profile and storing the resulting output generated from executing HTML links for each individual received email message. In yet another embodiment, the performance process include applying diagnostics to a portion of individual received messages that were generated as part of forming email messages at source SMTP servers. In one embodiment, the performance processes include applying heuristics to a portion of individual received messages that were generated as part of forming email messages at source SMTP servers.

Another embodiment of the present invention is a non-transitory computer-readable media that audits email marketing campaigns, comprising a plurality of instructions that, when executed, cause an electronic device to receive and store email messages transmitted over a public network and addressed to a designated email inbox at an audit SMTP server that is established for performing quality diagnostics. The received email messages were generated from one or more templates at a source email SMTP server and when received, include a plurality of parts including at least an address part, subject header part, time stamp part, HTML links to web content part, and a message body part. At least some of the plurality of parts or a portion thereof was generated after the message body is generated.

The computer-readable media also including instructions that parse the individual received email messages into parts and applying a group of different performance processes to the different parts of the email messages. The performance processes including a subset of the performance that applies individual device or agent profiles from a directory of profiles to individual parts or portions of the message body part of the received email messages. The computer-readable media also including instructions that process external network messages received in response to the individually applied profiles.

The computer-readable media also including instructions that produce and store output data generated from the performance processes that identifies quality characteristics in the different parts of the individual received email messages that represent faults that will occur from the use of the template in an email marketing campaign.

In one embodiment, the computer-readable media also including instructions that generate a multi-part report that incorporates the output data for an individual received email messages. In another embodiment, the multi-part report is transmitted over the public network. In one embodiment, the public network is the Internet. In another embodiment, the subset executes HTML links and interacts with other content in the received email messages by repeatedly specifying a device profile and storing the resulting output generated from executing HTML links for each individual received email message. In yet another embodiment, the performance processes include applying diagnostics to a portion of individual received messages that were generated as part of forming email messages at source SMTP servers. In one embodiment, the performance processes include applying heuristics to a portion of individual received messages that were generated as part of forming email messages at source SMTP servers.

An audit processor and analyzer can be a software tool that can be provided to customers such as using a software download or computer readable medium. The audit processor and analyzer can be installed on the customer network and adapted to work with the customer's email server involving a conventional email server, or an external email service such as to receive the sample message. The audit processor and analyzer can also be implemented by a service provider or on a cloud and receive sample mails at a predesignated email address for interaction with the audit processor and analyzer.

DETAILED DESCRIPTION OF THE PREFERRED EMBODIMENTS

The present method and system will be described in connection with the figures, it being understood that the description and figures are for illustrative, non-limiting purposes.

The complexity of emails messaging, network communications, content distribution, Internet standards, spam and firewall protections, and other developments have continued to increase and are now at a state of technological advancement much beyond the early stages of email and Internet. Email marketing has also evolved. Email service providers are used to generate email campaigns for distribution over the Internet or other public network. These can involve a company using a platform themselves or hiring a third party that generates the campaign. Such email campaigns are a significant area of marketing and is an adopted marketing channel among the many possible channels such as promotions or advertising on webpages. Such email campaigns can be directed to registered users of a company or website or through other email lists. However, such campaigns can be ineffective or devalue the brand of the company if the emails are not received or have errors when received. A software application as implemented on hardware can be provided as a tool to evaluate a sample email and perform various diagnostics. As part of this, the tool can incorporate diagnostics and heuristics to evaluate and generate the audit report (e.g., report email). The tool can exercise the email message through various iterations such as to exercise a link in the message using a list of devices such as different mobile devices including smartphones and tablets to determine whether the server that serves the content for that URL will perform properly across all the various mobile devices and device options. The tool can also perform a range of different categories of evaluations. The tool can include a capability for users to configure the tool to add new performance processes to the tool's diagnostic and evaluation processes and can also provide the capability to modify or add to existing tools (e.g., adding new words that may currently trigger spam filters). The tool may also rely on an API or other interface that provides an interface for the tool to communicate, transmit/receive data from the email service provider (e.g., the server and running email service provider application that transmitted the email), and/or to sends commands to the email service provider. The tool is sometimes referred to herein as the auditor. It should be understood that the auditor or components thereof may be unique individually or in combination.

Figure 1:
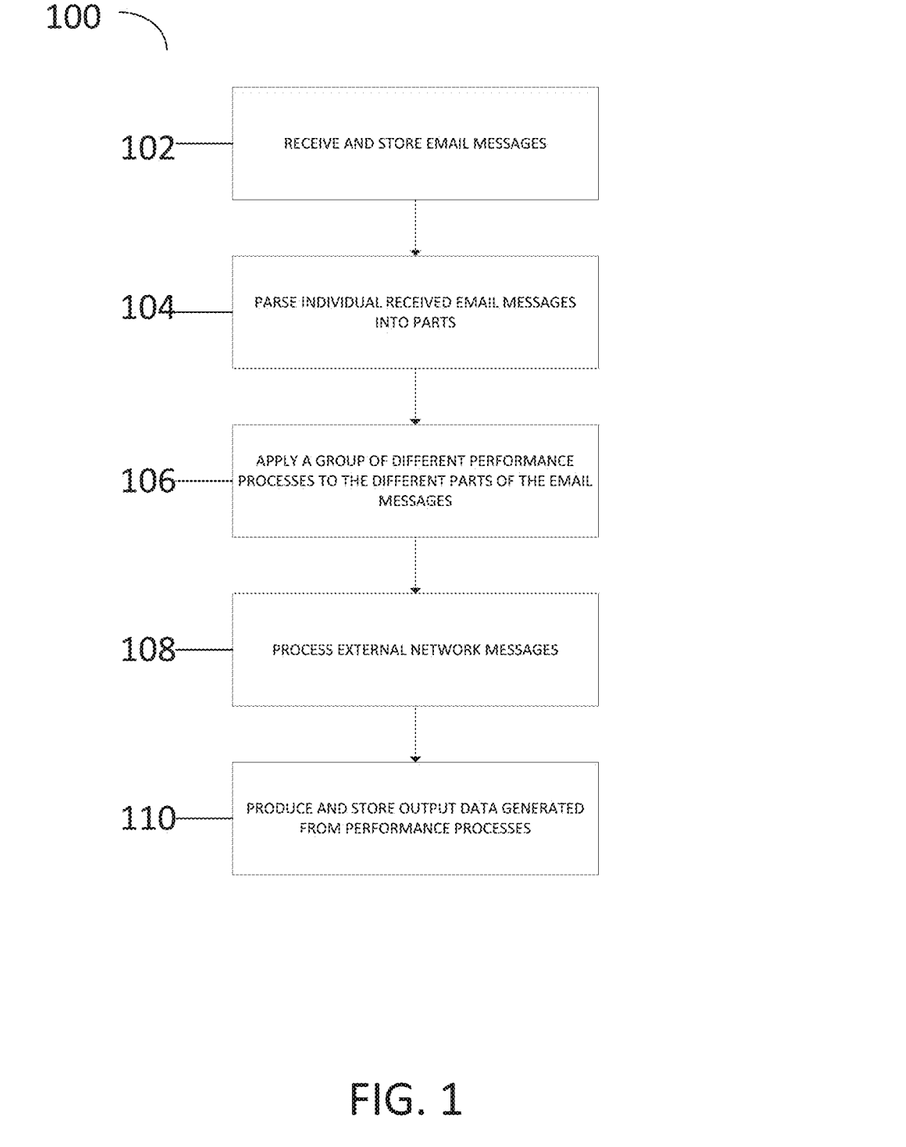
FIG. 1 is an exemplary process in accordance with one embodiment of the present invention.

With reference to FIG. 1, illustrated is an exemplary process 100 in accordance with one embodiment of the present invention. The process 100 includes receiving and storing email messages 102. Prior to launching an email marketing campaign, a test message may be delivered to a quality assurance address. This initiates a highly detailed quality assurance audit and an audit report may be generated. The email messages may be transmitted over a public network from a source email SMTP server. The email messages may be generated from one or more templates that make up an email marketing campaign. An email template is not the same as a received email message. The template is the email prior to the sending of the email message. It is more accurate to analyze an actual email rather than a template for many reasons. For example, when an email is sent, data is added to the email that was not part of the email template. Also, only checking the source code of an email does not fully explore all potential issues or errors.

The email is received and stored by a designated email inbox that is established for quality diagnostics. The received email message is then parsed into parts 104. Examples of the parts of the email message include but are not limited to an address part, subject header part, time stamp part, HTML links to web content part, and a message body part. At least some of the parts or a portion of are generated after the message body is generated (e.g., generated from an email marketing template). For example, the time stamp part would be generated most likely when the email message is transmitted.

Once the individual received email messages are parsed into parts, a group of different performance processes is applied to the different parts of the email messages 106. The performance processes include a subset of the performance processes that applies individual device or agent profiles from a directory of profiles to individual parts or portions of the message body part of the received email messages. For example, the system will run through a list of different client devices including a range of mobile devices and spoof or simulate that a link in the received email is being pulled for display in the spoofed or simulated device. This can test the performance of the content server and the delivery of the content to various devices. Then, the external network messages received in response to the individually applied profiles are processed 108. The external network messages may include error messages that are received with respect to the parts of the email message such as when a content server returns an error message instead of the requested image or other content. The external network messages received in response to exercised URL links can be processed and determined whether the message communicates an error such a network error message as opposed to an image itself. The analysis can be limited to determine to whether an error message is received and if desired, additional functionality can be implemented to determine whether the correct image/content was received or whether the image or content rendered properly. At a base level, a detection of whether an error message is received is implemented. The output data generated from the performance processes is then produced and stored 110. The output data identifies quality characteristics in the different parts of the individual received email messages that represent faults that will occur from the use of the template in an email marketing campaign.

Figure 2:
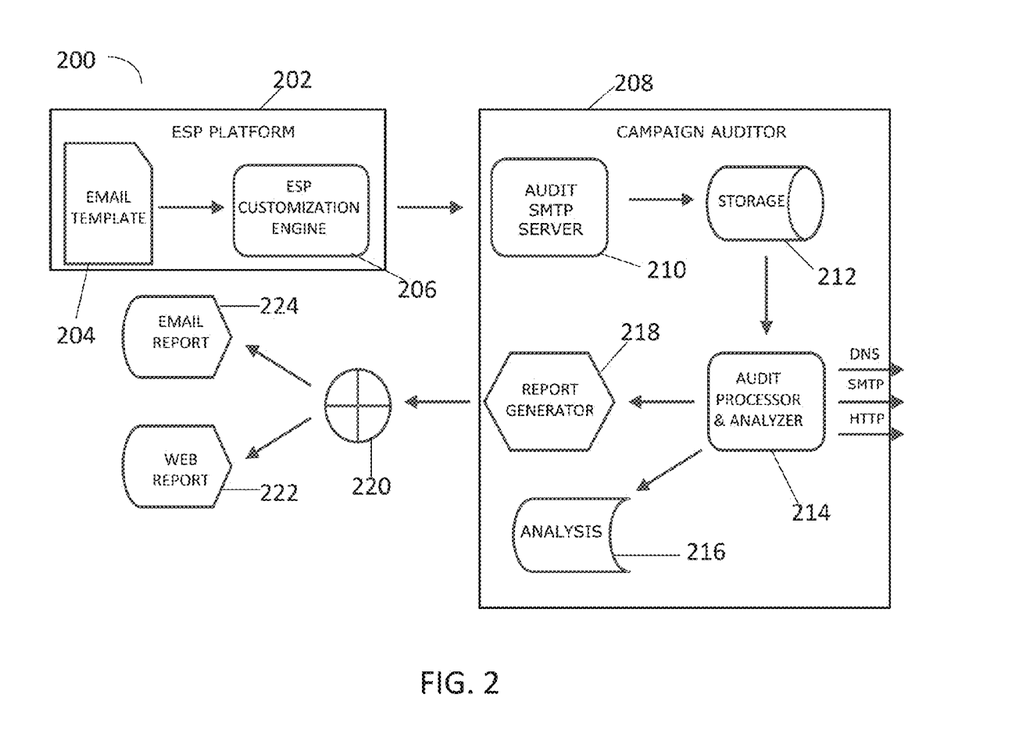
FIG. 2 is another exemplary process in accordance with one embodiment of the present invention.

Now referring to FIG. 2, which illustrates another exemplary process 200. Process 200 may include an Email Service Provider (ESP) Platform 202 and a campaign auditor 208. The ESP Platform 202 may include email template 204 and ESP customization engine 206. ESP Platform 202 may also be considered the source email SMTP server. Email template 204 may be the potential template for the future email marketing campaign. ESP customization engine receives email template 204 and turns email template 204 into an actual outbound email. A particular email address can be established and associated with a particular inbox at an SMTP server. The particular email address can be designated to be associated with the auditor system such that an email message to the address triggers the auditor system to evaluate the email when it is received in that inbox. The auditor system may also be configured such that it is adapted to check for the email message or has an option for a user to search and retrieve the email message.

The email is then routed to campaign auditor 208. Campaign auditor 208 may include audit SMTP server 210, storage 212, audit processor & analyzer 214, report generator 218, and analysis store 216. The email is received by audit SMTP server 210. Audit SMTP server 210 may include a designated email inbox that is established for performing quality diagnostics. The email message is also stored by storage 212. Storage 212 may be capable of storing any type of information, such as emails, database, reports, analysis, data, etc. The audit processor and analyzer 214 is in communication with the designated email inbox. Once the email message has been stored by storage 212, the email message is parsed into multiple parts by the audit processor and analyzer 214. The parts of the email message include but are not limited to address, subject header, time stamp, HTML to web content, message body part, etc. As a matter of clarification, some parts of the email message may not appear or be generated until after the email message has been selected to be transmitted at the sending email system. For example, the original template that the email message is generated from would not necessarily include some parts of the received email message.

After the email message is parsed, the audit processor and analyzer 214 applies a group of different performance processes to the different parts of the email messages. The audit processor and analyzer 214 verifies all the technical infrastructure aspects of the email message from authentication to the structure of the HTML. Examples of the types of technical audits, analysis, or processes may include: testing that subject is not too long; subject does not contain any unencoded 8-bit characters; checking to see if a signature or other verification is present and valid, such as a DomainKeys Identified Mail (DKIM) signature; checking to see if a sender policy framework (SPF) record exists and is valid; checking that the text content encoding is valid and the lines are less than 72 characters, checking that HTML content encoding is valid and lines are less than a predetermined number of characters; and checking that HTML coding is valid for email. The technical audits and analysis are not limited to only those listed above.

The audit processor and analyzer 214 also verifies that the email message functions as it should. It checks that the addresses used are valid, all the images load and the links go to valid destinations. Examples of the types of functional audits and analysis may include: testing that the from address is valid and does not contain customization codes; testing that the reply address is valid and does not contain customization codes; checking that the to address does not contain customization codes; checking that all HTML links are valid and tracked; checking that destination URLs do not contain customization fields; checking that a tracking alias exists for each HTML link; checking that all texts links are valid and tracked; checking that a tracking alias exists for each text link; checking that the text and HTML links are valid for multiple different mobile devices; checking that all images and media exist and are valid; and checking that an open-rate tracking image is present.

The audit processor and analyzer 214 also performs a number of checks on the copy in the subject line, HTML part and text or message body part. Examples of these types of audits and analysis may include subject, text and HTML do not contain placeholder copy, customization placeholders, unsubstituted customization fields and pass a spellcheck, and spam content analysis.

The audit processor and analyzer 214 also may perform individual part analysis for the different parts of the email message, such as header validation, message content validation, HTML link validation, text link validation, mobile link validation, HTML structural validation, image rendering verification, and content assessment. The header validation may include checking that the From, To, ReplyTo and Subject headers in the email message are formatted for length, format, and customization fields. The actual addresses may be verified by connecting to the appropriate servers and by determining whether the server will accept email for those addresses. In addition, the header fields may be checked for unresolved customization fields and a check may be made to verify the presence of a DKIM Signature (or other signature) and a SPF/CallerID record.

The message content validation may include verifying the character set, content encoding and line lengths for the email message. Also, a spam content analysis may be performed.

The message may also be searched for any unresolved merge or substitution fields. The message content validation may also include confirming text content encoding, text wrapping, text customization, HTML content encoding, HTML line length, HTML customization and spam content check.

The HTML link validation may include checking that all the links present in the HTML part of the mailing are verified. It may also include determining that the tracking status of each link and its validity is indicated. The HTML link validation may also include checking that URLs are valid and if they're tracked, confirm existence of a tracking alias, and checking that destination URLs do not contain customization fields.

The text link validation may include determining that all the text links present in the text part of the email message are verified. It may also include determining that the tracking status of each link is valid. The text link validation may also include checking if the URLs are valid and tracked, confirm existence of a tracking alias, and check that destination URLs do not contain customization fields.

The mobile link validation helps prevent different mobile devices from rendering links incorrectly from what was intended because many content provider systems redirect links differently for mobile devices. The mobile link validation would ensure that all links are verified for mobile devices by checking that the URLs are valid for mobile devices or checking that the destination URLs do not contain fields on mobile devices.

Poorly coded HTML can cause platform-specific rendering problems. The HTML structural validation may check and validate the integrity of the HTML by validating the HTML structure. The image rendering verification may extract and/or display images or media within the message to validate the images or media. The image rendering verification may include validating external media in the message, retrieving all images and media, displaying a thumbnail (e.g., in an audit report or GUI window) and confirming an open-rate tracking image is present. A content assessment check may also be performed to confirm that the content does not contain any placeholder text, incorrectly configured substitution fields or other inappropriate copy.

The audit processor and analyzer 214 may also be in communication with the public network either directly or indirectly. In order to determine validity of email address, HTML and text links, the audit processor and analyzer 214 needs to be able to communicate over the public network with other servers, entities, etc. The results of the analysis are stored in the analysis store 216. The analysis store 216 and storage 212 may be separate storage devices or may also be different partitions or sections of the same device. The raw data of the analysis may be temporarily stored until the raw data is compiled into a final format, such as a report. The raw data may also be permanently stored.

Figure 4:
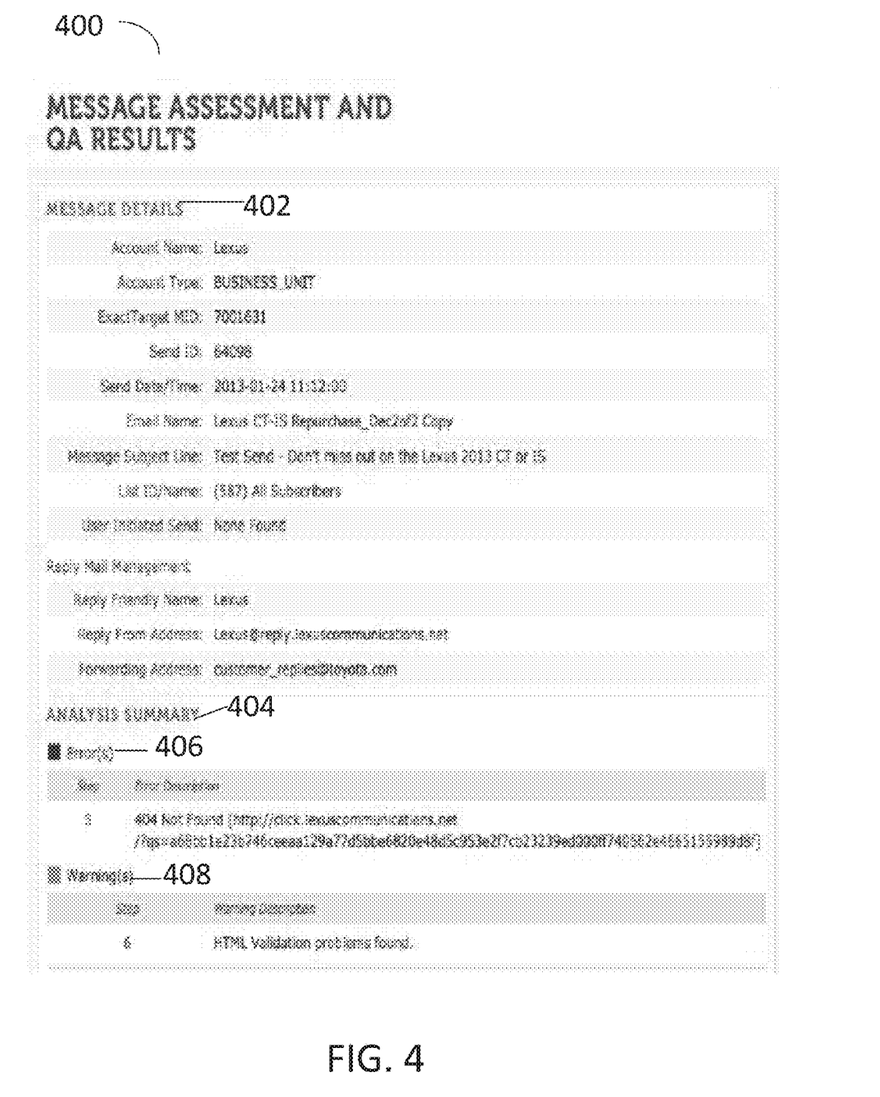
FIG. 4 is an exemplary screenshot of a generated report in accordance with one embodiment of the present invention.
Figure 5:
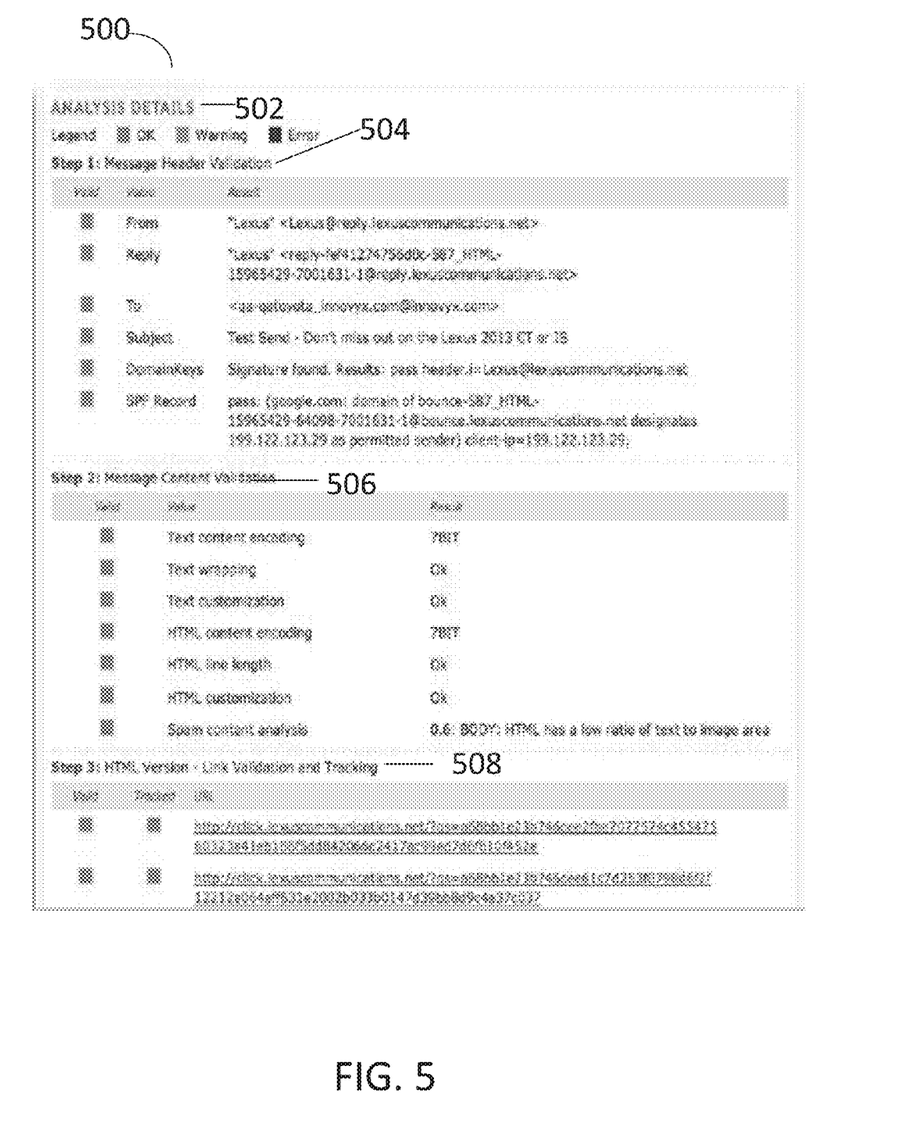
FIG. 5 is another exemplary screenshot of a generated report in accordance with one embodiment of the present invention.
Figure 6:
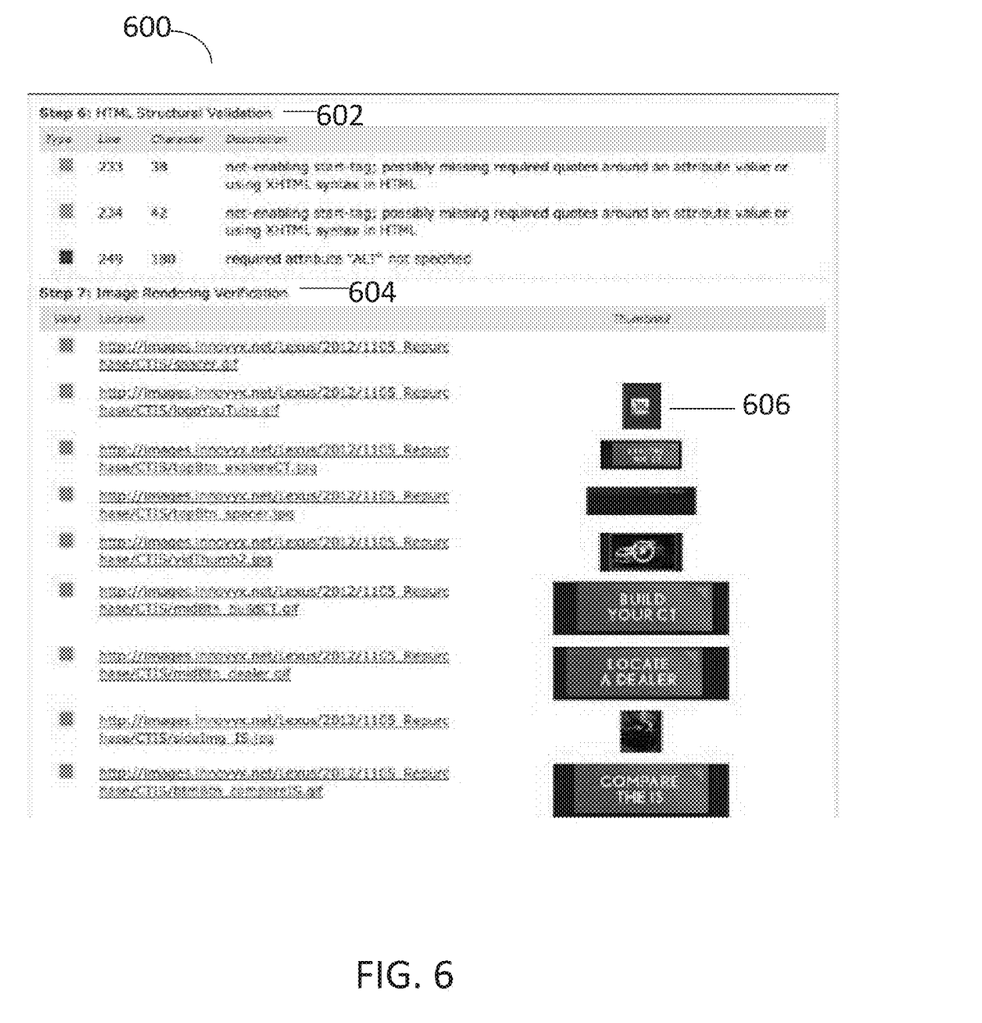
FIG. 6 is another exemplary screenshot of a generated report in accordance with one embodiment of the present invention.

Once all of the parts of the individual email message has been audited and analyzed, the raw data is communicated to the report generator 218. The report generator 218 compiles all of the raw data from the audit processor and analyzer 214 and compiles a report that summarizes the results of the audit. The report may be in many different formats and range from very broad to very specific. The report may include a grading or rating system for how well the email message did in the audit. The report may also just provide a breakdown of information about any errors or potential errors for each analyzed part of the email message. Examples of how the report, may look are illustrated in FIGS. 4-6, discussed in more detail below. The report generator 218 may include an Application Programming Interface (API) for communicating with the ESP Platform 202. The communication may be in may be different formats, such as the email audit report.

The API may also be used to retrieve information about the email campaign. The API may also be used to identify tracking alias or URLS defined within the ESP Platform 202. The API may also be used to help analyze any recipient data. The API is not only limited to being part of the report generator 218 but may be part of any component of the campaign auditor 208 or a separate component. A tracked alias or URL may be a URL that is tracked for marketing, advertising or other information gathering purpose. The API may exchange messages with the ESP over a network in order to carrying its functionality and provide information or data to the audit processor and analyzer.

After the report generator 218 generates a report, the report may be communicated to the originator 220 of the email message. The report may be communicated in several different methods, such as an email message or a web page over a network such as the Internet. Most likely, the originator 220 of the email message is a client or an entity that develops email marketing campaigns. The originator 220 is associated with the ESP platform 202. The communication from the report generator 218 may be in the form of an email message that directs a user to a web report 222 with a URI, link or email message may include the report 224.

Figure 3:
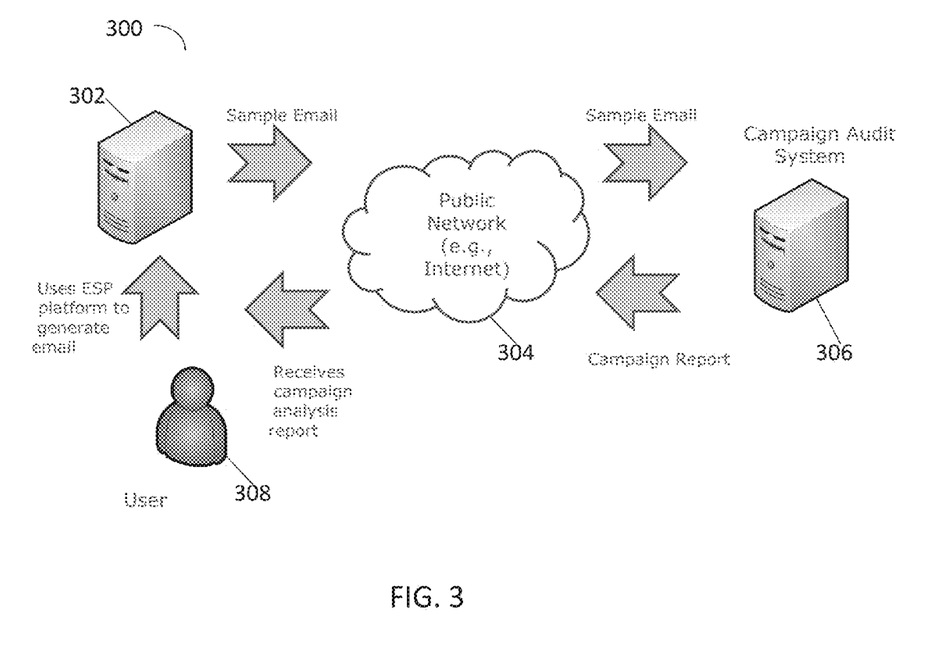
FIG. 3 is an exemplary system diagram in accordance with one embodiment of the present invention.

Now referring to FIG. 3, which illustrates exemplary system 300 comprising computing devices and connecting networks (e.g., wireless or wired) in accordance with one embodiment of the present invention. System 300 may include an ESP platform server 302 (e.g., a computing device), public network 304, campaign audit system 306, and a user 308. The email template discussed above originates from the ESP platform server 302. As discussed above, the ESP platform server 302 may include components including an email template and an ESP customization engine. The email template may be generated by user 308 using existing information or another email template. The email template is sent over the public network 304. Once the email template is sent, the email template becomes an actual email that is received by the campaign audit system 306. As discussed above, the campaign audit system 306 may include components including an audit SMTP server, storage, report generator, audit processor and analyzer, and an analysis store. The audit processor and analyzer can have its own storage or cache that receives the sample email message and can receive it from the SMTP server (e.g., by interacting with the server or related email handling components) such as from an inbox that is part of the email system. The same process discussed above with respect to receiving and analyzing the received email message, and generating a report based on the analyzation of the received email message is performed. The components of the campaign audit system may be all located within one server or co-located across multiple servers/devices. Once the report is generated, it is transmitted to the user 308. The report may be an email, a link to a webpage, etc. Based on the results of the report, the user 308 has the ability to make any necessary changes indicated by the results to the original email template. The user 308 may also decide to resubmit the updated email template through the whole process again.

Now referring to FIGS. 4-6, which illustrate an exemplary screenshot of a generated report of the present invention. FIGS. 4-6 illustrate an example of the generated report that may be transmitted through email or viewed via a webpage. FIG. 4 illustrates the first part of the generated report. Screenshot 400 illustrates an example of message assessment and quality assurance results. Screenshot 400 may include message details 402, an analysis summary 404, an error section 406, and a warning section 408. Screenshot 400 may be a broad overview of the report possibly only giving general information or analysis about the email message.

The message details section 402 may include information such as account name, account type, identifiers, date/time, title of email, message subject line, address information and other information that is important or useful for the overall message. The account name or type may reflect the ESP platform server, user or originator mentioned above. The analysis summary 404 summarizes overall errors or warnings that might be present in the email message. The error section 406 may include a list of any potential or definite errors found within the email message. The error section 406 may also include a reference that indicates where the user can find more detailed information about this specific error in the report. For example, the error listed in the error section 406 lists "step 6" and a "404 Not Found." This may indicate that you can find more information in the report at "step 6" and the reason for the error is the "404 Not Found." Errors usually indicate that a problem has to be fixed. Also, the dark box next to "Error(s)" may indicate the severity of the error. The boxes may be color coded based on the severity of the issue. The warning section 408 may include a list of any potential or definite warnings found within the email message. Warnings usually do not have to be fixed but in order for the email message to work as intended, it most likely would need to be corrected.

Screenshot 500 illustrates another portion of the generated report. Screenshot 500 may include analysis details 502, step 1 504, step 2 506, and step 3 508. The analysis details 502 may correspond to more detailed information mentioned in the analysis summary of screenshot 400. The analysis details 502 section may also include a legend that defines different indicators to mean different things. In this example, the legend indicates different colored boxes to indicate either that the status of the issue is OK, Warning or Error. Other indicators or methods of rating the severity of issues should also be appreciated.

One objective for the system is to identify and report with respect to error or failures as opposed to issues of partial performance. Other objectives can be incorporated and included that are directed to partial performance problems.

Step 1 504 is the message header validation check. In this report, all of the items that are checked are listed. The report could also only list any warnings or errors. Step 1 504 lists all of the items that are checked in the message header validation check and indicates the result, which for all of the items shown are valid and ok. It should be appreciated that this report is merely an example and not an exhaustive list of all of the checks and tests performed.

Step 2 506 is the message content validation check. Similar to step 1, step 2 is a list of the checks and tests performed for this step and the results of each test. In this illustration, all of the tests were valid and OK. Step 3 508 is the HTML version or link validation and tracking check. Step 3 has an indicator for validity and whether or not the link is tracked.

Screenshot 600 illustrates another portion of the generated report. Screenshot 600 may include step 6 602, step 7 604 and media thumbnails 606. Step 6 602 is the HTML structural validation check. Step 6 602 lists any potential issues and where in the HTML code the potential issue may be found. Step 6 602 also gives a description as to why there might be a potential issue. Step 6 602 may also have indicators that correspond to the color coded boxes on screenshot 500. Step 7 604 is the image rendering verification check. Step 7 604 lists the images or media within an email message and indicates whether or not the image or media is valid. Also, media thumbnails 606 displays a thumbnail of the corresponding media or image that received in response to exercising links in the email and are stored for retrieval as part of the report.

A computing device can include a computer, computer system or other programmable electronic device, including a client computer, a server computer, a portable computer (including a laptop and a tablet), a handheld computer, a mobile phone (including a smartphone), a gaming device, an embedded controller and any combination and/or equivalent thereof (including touchless devices). Moreover, the computing device may be implemented using one or more networked computers, e.g., in a cluster or other distributed computing system. It is understood that the exemplary environment discussed and illustrated is not intended to limit the present disclosure, and that other alternative hardware and/or software environments may be used without departing from the scope of this disclosure. The present techniques can be applied to devices other than hand-held devices, such as laptops or desktop computers.

For clarity, the terms "computing device", "computer device", "computer" and "machine" are understood to be interchangeable terms and shall be taken to include any collection of computing devices that individually or jointly execute a set (or multiple sets) of instructions to perform any one or more of the methods discussed herein.

The local storage can include volatile memory (such as RAM) and/or non-volatile memory (such as ROM as well as any supplemental levels of memory, including but not limited to cache memories, programmable or flash memories and read-only memories). The portable computing device or mobile device can include one or more processing devices (e.g, one or more central processing units (CPUs), one or more graphics processing units (GPUs), one or more microprocessors (µP) and similar and complementary devices) and optional media devices (e.g., a hard disk module, an optical disk module, etc.). Additionally, any storage techniques used in connection with the presently disclosed method and/or system may invariably be a combination of hardware and software.

The computing devices, server, or other discrete software or hardware components can communicate and are arranged to carry out the illustrative processes and applications described herein by way of sending a signal such as a packet, digital message, or a command within a communication to or between components (and act in response to the receipt of a signal to carry our processes) and between or through supporting software or hardware such as communicating with an operating system, communicating with another resident application through an API or the like, communicating between network elements using an Internet protocol or one or more layers of the OSI model, or communicating through an intermediate component.

An SMTP server should generally be understood to be the technology including standardized email-protocol-implemented hardware and software components for receiving, handling, and sending email messages.

One or more features illustratively described herein can be implemented individually or in various combinations. The present system, method, or related inventions also relate to a non-transient computer readable medium configured to carry out any one of the methods disclosed herein. The application can be set of instructions readable by a processor and stored on the non-transient computer readable medium. Such medium may be permanent or semi-permanent memory, such as hard drive, floppy drive, optical disk, flash memory, ROM, EPROM, EEPROM, etc., as would be known to those of ordinary skill in the art. Features or characteristics described in one context, process, or device are applicable to other context, process or devices described herein. The steps of the processes illustratively described herein can be performed in a different order, if desired. Also, steps could be added or removed from the processes illustratively described herein. The processes and systems illustratively described herein can be implemented using the described examples of hardware and network configurations.

The terms and expressions which have been employed in the specification are used as terms of description and not of limitations, there is no intention in the use of such terms and expressions to exclude any equivalents of the features shown and described or portions thereof, but it is recognized that various modifications are possible within the scope of the claims to the invention.

What is claimed is:

1. A system that audits email marketing campaigns, the system comprising:
    a non-transitory computer readable medium including a set of instructions;
    an audit SMTP server, that is configured to receive and store email messages transmitted over a public network and addressed to a designated email inbox at the audit SMTP server and established for performing quality diagnostics, wherein the received email messages were generated from one or more templates at a source email SMTP server and when received, include a plurality of parts including at least an address part, subject header part, time stamp part, HTML links to web content part, and a message body part, at least some of which or a portion thereof was generated after the message body is generated; and
    an audit processor and analyzer, wherein the audit processor is configured to execute the set of instructions which are stored on the non-transitory computer readable medium, that is coupled to the designated email inbox and configured to parse the individual received email messages into parts and apply a group of different performance processes to the different parts of the email messages including a subset of the performance that applies individual device or agent profiles from a directory of profiles to individual parts or portions of the message body part of the received emails messages and processes external network messages received in response to the audit processor and analyzer individually applying the profiles, wherein the audit processor and analyzer is further configured to produce and store output data generated from the performance processes that identifies quality characteristics in the different parts of the individual received email messages that represent faults that will occur from the use of the template in an email marketing campaign over a network.

2. The system of claim 1 wherein the audit processor and analyzer generates a multi-part report that incorporates the output data for an individual received email message.

3. The system of claim 1 wherein the subset executes HTML links and interacts with other content in the received email messages by repeatedly specifying a device profile and storing the resulting output generated from executing HTML links for each individual received email message.

4. The system of claim 1 wherein the performance processes include applying diagnostics to a portion of individual received messages that were generated as part of forming email messages at source SMTP servers.

5. The system of claim 1 wherein the performance processes include applying heuristics to a portion of individual received messages that were generated as part of forming email messages at source SMTP servers.

6. The system of claim 2 wherein the multi-part report is transmitted over the public network.

7. The system of claim 1 wherein the public network is the Internet.

8. A method that audits email marketing campaigns, the method comprising:
    receiving and storing email messages transmitted over a public network and addressed to a designated email inbox at an audit SMTP server that is established for performing quality diagnostics, wherein the received email messages were generated from one or more templates at a source email SMTP server and when received, include a plurality of parts including at least an address part, subject header part, time stamp part, HTML links to web content part, and a message body part, at least some of which or a portion thereof was generated after the message body is generated;
    parsing the individual received email messages into parts;
    applying a group of different performance processes to the different parts of the email messages including a subset of the performance that applies individual device or agent profiles from a directory of profiles to individual parts or portions of the message body part of the received email messages;
    processing external network messages received in response to the individually applied profiles; and
    producing and storing output data generated from performance processes that identifies quality characteristics in the different parts of the individual received email messages that represent faults that will occur from the use of the template in an email marketing campaign over a network.

9. The method of claim 8 further comprising generating a multi-part report that incorporates the output data for an individual received email message.

10. The method of claim 8 wherein the subset executes HTML links and interacts with other content in the received email messages by repeatedly specifying a device profile and storing the resulting output generated from executing HTML links for each individual received email message.

11. The method of claim 8 wherein the performance processes include applying diagnostics to a portion of individual received messages that were generated as part of forming email messages at source SMTP servers.

12. The method of claim 8 wherein the performance processes include applying heuristics to a portion of individual received messages that were generated as part, of forming email messages at source SMTP servers.

13. The method of claim 9 wherein the multi-part report is transmitted over the public network.

14. The method of claim 8 wherein the public network is the Internet.

15. A non-transitory computer-readable media that audits email marketing campaigns, comprising a plurality of instructions that, when executed, cause an electronic device to:
    receive and store email messages transmitted over a public network and addressed to a designated email inbox at an audit SMTP server that is established for performing quality diagnostics, wherein the received email messages were generated from one or more templates at a source email SMTP server and when received, include a plurality of parts including at least an address part, subject header part, time stamp part, HTML links to web content part, and a message body part, at least some of which or a portion thereof was generated after the message body is generated;

parse the individual received email messages into parts;

apply a group of different performance processes to the different parts of the email messages including a subset of the performance that applies individual device or agent profiles from a directory of profiles to individual parts or portions of the message body part of the received email messages;

process external network messages received in response to the individually applied profiles; and produce and store output data generated from the performance processes that identifies quality characteristics in the different parts of the individual received email messages that represent faults that will occur from the use of the template in an email marketing campaign over a network.

16. The computer-readable media of claim 15 further comprising generating a multi-part report that incorporates the output data for an individual received email message.

17. The computer-readable media of claim 15 wherein the subset executes HTML links and interacts with other content in the received email messages by repeatedly specifying a device profile and storing the resulting output generated from executing HTML links for each individual received email message.

18. The computer-readable media of claim 15 wherein the performance processes include applying diagnostics to a portion of individual received messages that were generated as part of forming email messages at source SMTP servers.

19. The computer-readable media of claim 15 wherein the performance processes include applying heuristics to a portion of individual received messages that were generated as part of forming email messages at source SMTP servers.

20. The computer-readable media of claim 16 wherein the multi-part report is transmitted over the public network.

* * * * *